(12) United States Patent
Kawakatsu et al.

(10) Patent No.: US 8,025,159 B2
(45) Date of Patent: Sep. 27, 2011

(54) AGENT FOR INCREASING REJECTION WITH A PERMEABLE MEMBRANE, PROCESS FOR INCREASING THE REJECTION, PERMEABLE MEMBRANE AND PROCESS FOR WATER TREATMENT

(75) Inventors: Takahiro Kawakatsu, Saitama (JP); Nobuhiro Orita, Yokohama (JP); Kunihiro Hayakawa, Hasuda (JP)

(73) Assignee: Kurita Water Industries Ltd., Tokyo (JP)

( * ) Notice: Subject to any disclaimer, the term of this patent is extended or adjusted under 35 U.S.C. 154(b) by 879 days.

(21) Appl. No.: 11/664,996

(22) PCT Filed: Oct. 17, 2005

(86) PCT No.: PCT/JP2005/019446
§ 371 (c)(1),
(2), (4) Date: Apr. 9, 2007

(87) PCT Pub. No.: WO2006/043684
PCT Pub. Date: Apr. 27, 2006

(65) Prior Publication Data
US 2009/0032466 A1 Feb. 5, 2009

(51) Int. Cl.
*B01D 63/00* (2006.01)
(52) U.S. Cl. ......... 210/500.38; 96/8; 210/636; 210/639; 210/698; 427/245; 427/407.1
(58) Field of Classification Search ............... 210/500.1, 210/500.21, 500.27, 506, 636, 639, 650–652, 210/321.6, 500.28, 500.38, 500.39, 500.41, 210/500.42, 638, 490, 500.37, 654, 698; 95/45; 96/8–10; 427/245, 401.1, 417, 402; 428/315.5, 315.9, 316.6; 264/41, 45.1, 48
See application file for complete search history.

(56) References Cited

U.S. PATENT DOCUMENTS 3,462,362 A * 8/1969 Kollsman .................. 210/636
(Continued)

FOREIGN PATENT DOCUMENTS

EP 0 238 276 A2 9/1987
(Continued)

OTHER PUBLICATIONS

M. Urari et al., "Bipolar reverse osmosis membrane for separating mono- and divalen ions", *Journal of Membrane Science*, vol. 70, Nos. 2+3, pp. 153-162 (Jun. 17, 1992) (including title page).

(Continued)

*Primary Examiner* — Joseph Drodge
(74) *Attorney, Agent, or Firm* — Holtz, Holtz, Goodman & Chick, PC

(57) ABSTRACT

An agent for increasing the rejection with a permeable membrane which comprises an ionic macromolecule having a weight-average molecular weight of 100,000 or greater; a process for increasing the rejection with a permeable membrane which comprises treating a permeable membrane with the agent; a permeable membrane which is treated in accordance with the process; and a process for water treatment which comprises using the permeable membrane are disclosed. By using the above agent, an increased rejection of inorganic electrolytes and organic compounds soluble in water can be maintained for a long time easily and safely at the location of the use of the membrane without extreme decrease in the flux of permeation in the membrane separation using a selective permeable membrane such as a nano filtration membrane and a reverse osmosis membrane.

12 Claims, 4 Drawing Sheets

→✳— REJECTION OF NaCl
—●— REJECTION OF IPA
◆ FLUX OF PERMEATION OF PURE WATER
△ FLUX OF PERMEATION OF AQUEOUS SOLUTION OF NaCl AND IPA
▲ FLUX OF PERMEATION OF AQUEOUS SOLUTION OF POLYVINYLAMIDINE, NaCl AND IPA
▲ FLUX OF PERMEATION OF AQUEOUS SOLUTION OF SODIUM POLYSTYRENESULFONATE, NaCl AND IPA

U.S. PATENT DOCUMENTS

| | | | | |
|---|---|---|---|---|
| 3,784,457 | A | * | 1/1974 | Mizutani et al. ............... 204/529 |
| 3,808,303 | A | | 4/1974 | Ganci et al. |
| 3,808,305 | A | * | 4/1974 | Gregor ..................... 264/331.12 |
| 3,877,978 | A | | 4/1975 | Kremen et al. |
| 4,125,462 | A | | 11/1978 | Latty |
| 4,250,029 | A | * | 2/1981 | Kiser et al. .................... 210/652 |
| 4,338,194 | A | * | 7/1982 | Tanny ........................... 210/490 |
| 4,604,208 | A | | 8/1986 | Chu et al. |
| 4,693,985 | A | * | 9/1987 | Degen et al. .................. 436/531 |
| 4,704,324 | A | | 11/1987 | Davis et al. |
| 4,708,803 | A | * | 11/1987 | Ostreicher et al. ............ 210/650 |
| 4,812,270 | A | | 3/1989 | Cadotte et al. |
| 5,028,335 | A | * | 7/1991 | Sleytr et al. ................... 210/638 |
| 5,154,829 | A | * | 10/1992 | Degen et al. .................. 210/638 |
| 5,411,889 | A | * | 5/1995 | Hoots et al. ........................ 436/6 |
| 5,462,867 | A | * | 10/1995 | Azad et al. .................... 435/181 |
| 5,658,465 | A | * | 8/1997 | Nicholas et al. ............. 210/698 |
| 6,071,417 | A | * | 6/2000 | Adachi ........................ 210/723 |
| 6,730,227 | B2 | * | 5/2004 | Zeiher et al. .................. 210/650 |
| 6,783,937 | B1 | | 8/2004 | Hou et al. |
| 6,821,428 | B1 | * | 11/2004 | Zeiher et al. .................. 210/634 |
| 7,041,338 | B2 | * | 5/2006 | Nigam ....................... 427/407.1 |
| 2006/0148949 | A1 | * | 7/2006 | Ono .............................. 524/386 |

FOREIGN PATENT DOCUMENTS

| | | |
|---|---|---|
| JP | 50-140378 | 11/1975 |
| JP | 53-028083 A | 3/1978 |
| JP | 55-011048 A | 1/1980 |
| JP | 55-114306 A | 9/1980 |
| JP | 56-067504 A | 6/1981 |
| JP | 57-119804 A | 7/1982 |
| JP | 02-014725 A | 1/1990 |
| JP | 02-068102 A | 3/1990 |
| JP | 4-74043 B2 | 11/1992 |
| JP | 2762358 B2 | 6/1998 |
| JP | 10-309449 A | 11/1998 |
| JP | 2001-513436 A | 9/2001 |
| JP | 2003-088730 A | 3/2003 |
| WO | WO 87/02682 A1 | 5/1987 |
| WO | WO 99/10089 A1 | 3/1999 |

OTHER PUBLICATIONS

European Search Report dated Sep. 10, 2010 in European Application EP 10 008 143.9.
Notice of Reason(s) of Rejection dated Jul. 9, 2010 for Japanese patent application No. 2004-303125.
Partial English-language translation of JP 10-309449.
Partial English-language translation of JP 02-014725.

* cited by examiner

---*---   REJECTION OF NaCl
△   FLUX OF PERMEATION OF AQUEOUS SOLUTION OF NaCl
◆   FLUX OF PERMEATION OF PURE WATER
▲   FLUX OF PERMEATION OF AQUEOUS SOLUTION OF SODIUM PLYACRYLATE AND NaCl

—✳— REJECTION OF NaCl
---◉--- REJECTION OF IPA
◆ FLUX OF PERMEATION OF PURE WATER
△ FLUX OF PERMEATION OF AQUEOUS SOLUTION OF NaCl AND IPA
▲ FLUX OF PERMEATION OF AQUEOUS SOLUTION OF POLYVINYLAMIDINE, NaCl AND IPA
▲ FLUX OF PERMEATION OF AQUEOUS SOLUTION OF SODIUM POLYSTYRENESULFONATE, NaCl AND IPA

△ UNUSED MEMBRANE
▲ MEMBRANE TREATED FOR INCREASING REJECTION

AGENT FOR INCREASING REJECTION WITH A PERMEABLE MEMBRANE, PROCESS FOR INCREASING THE REJECTION, PERMEABLE MEMBRANE AND PROCESS FOR WATER TREATMENT

This application is the United States national phase application of International Application PCT/JP2005/019446 filed Oct. 17, 2005.

TECHNICAL FIELD

The present invention relates to an agent for increasing the rejection with a permeable membrane, a process for increasing the rejection, a permeable membrane and a process for water treatment. More particularly, the present invention relates to an agent for increasing the rejection of inorganic electrolytes and organic substances soluble in water in the membrane separation using a selective permeable membrane such as a nano filtration membrane and a reverse osmosis membrane, a process for increasing the rejection using the agent, a permeable membrane having a rejection increased by the treatment in accordance with the process and a process for water treatment using the permeable membrane.

BACKGROUND ART

The rejection of inorganic electrolytes and organic substances soluble in water with a selective permeable membrane such as a nano filtration membrane and a reverse osmosis membrane decreases due to degradation of the macromolecular material by the effect of oxidative substances and reductive substances present in water and by other causes, and it becomes difficult that the required quality of the treated water is obtained. This decrease may take place gradually during a long period of the use or suddenly due to an accident. When this decrease takes place, it is required that the ability of the membrane be recovered from the degraded condition without separating the membrane from the module to which the membrane is disposed and, where possible, the recovery be achieved while the operation of treating the supplied water is continued.

To satisfy the above requirement, processes for maintaining the rejection exhibited with an unused permeable membrane for a long time and repair processes for recovering the rejection with a permeable membrane exhibiting a decreased rejection are developed. For example, as the process for regenerating a selective permeable membrane on which organic substances having anionic groups are deposited, a process in which the permeable membranes is treated with an aqueous solution of an amphoteric surfactant having a quaternary amino group or a cationic surfactant is proposed (Patent Reference 1). As the process for maintaining the properties of a reverse osmosis membrane exhibited in the unused condition for a long time and recovering the rejection of salts with the membrane decreased by the use, a process in which the reverse osmosis membrane is brought into contact with an agent for treating a membrane such as polyvinyl methyl ether, polyvinyl alcohol and polyacrylic acid in the condition of a great concentration and then with the agent continuously in the condition of a small concentration is proposed (Patent Reference 2). As the process for improving the rejecting ability and the maintenance of the ability of a semipermeable membrane, a treatment process in which an auxiliary polymer having acetyl group is added to a semipermeable membrane is proposed (Patent Reference 3). As the agent for treating a semipermeable membrane which is applied not only to a used semipermeable membrane but also to an unused semipermeable membrane and improves permeation of the solvent and separation of solutes, a treatment agent which comprises a vinyl-based polymer having an organic group having acetoxy group and terminal carboxyl group as the side chain is proposed (Patent Reference 3). However, these processes and agents have problems in that the increase in the rejection is possible only to a small degree, the decrease in the flux of permeation is great, and the increased rejection is not sufficiently maintained.

As for the process or the agent used for treating a cellulose acetate membrane, for example, a process in which a portion of defect is coated with a liquid substance having compatibility with the membrane and exhibiting the plasticizing effect, followed by smoothing the formed surface is proposed as the effective process for repairing and recovering a small defect found after the membrane is set at a module (Patent Reference 5). However, in accordance with this process, the material of the membrane which can be treated is limited, and complicated operations such as heating are required. As the agent for enhancing separation of solutes which shows a small decrease in the permeability of water and is durable, an agent comprising a vinyl polymer having an alkoxyl group, carboxyl group and an alkoxycarbonyl group in the side chains is proposed (Patent Reference 6).

A nano filtration membrane having adsorbed polyethyleneimine having a molecular weight of 70,000 is reported (Non-Patent Reference 1). Although the rejection of NaCl is about 15%, a rejection of $MgCl_2$ of 90% or greater is obtained at a pH of 4. However, the rejection of $MgCl_2$ is decreased by 3% after 15 hours, and the main cause for the decrease is considered to be the small molecular weight of polyethyleneimine. As the process for treating a reverse osmosis membrane which can maintain the effect of decreasing the concentration of solutes in water passed through the membrane for a long time and can separate boron which is not dissociated in a non-electrolytic organic substance or in a neutral range with a great rejection, a process in which a pressure-resistant vessel in an apparatus for the membrane separation is packed with a reverse osmosis element having a polyamide skin layer and, thereafter, an aqueous solution of free chlorine containing bromine is brought into contact with the element, is proposed (Patent Reference 7). In accordance with this process, bromine is introduced to the surface of the membrane, and the surface is chemically modified. Since chlorine and bromine are used in great concentrations, it is necessary that a great care be taken for the control of the reaction conditions and also for the safety. Therefore, it is difficult that the operation of increasing the rejection with a membrane is conducted at the place of the use.

[Patent Reference 1] Japanese Patent Application Laid Open No. Showa 57(1982)-119804 (page 1)
[Patent Reference 2] Japanese Patent Application Laid Open No. Showa 53(1978)-28083 (pages 1 and 2)
[Patent Reference 3] Japanese Patent Application Laid Open No. Showa 50(1975)-140378 (page 1)
[Patent Reference 4] Japanese Patent Application Laid Open No. Showa 55(1980)-114306 (pages 1 and 2)
[Patent Reference 5] Japanese Patent Application Laid Open No. Showa 56(1981)-67504 (pages 1 and 2)
[Patent Reference 6] Japanese Patent Application Laid Open No. Showa 55(1980)-11048 (pages 1 and 2)
[Patent Reference 7] Japanese Patent Application Laid Open No. 2003-88730 (page 2)

[Non-Patent Reference 1] Urairi et al., Journal of Membrane Science, 70(1992) 153-162.

DISCLOSURE OF THE INVENTION

The present invention has an object of providing an agent for increasing the rejection with a permeable membrane which can maintain the increased rejection of inorganic electrolytes and organic compounds soluble in water for a long time easily and safely at the location of the use of the membrane without extreme decrease in the flux of permeation in the membrane separation using a selective permeable membrane such as a nano filtration membrane and a reverse osmosis membrane, a process for increasing the rejection which comprises using the agent, a permeable membrane which exhibits an increased rejection by the treatment in accordance with the process, and a process for water treatment which comprises using the permeable membrane.

As the result of intensive studies by the present inventors to achieve the above object, it was found that the rejection could be remarkably increased by treating a permeable membrane with an aqueous solution of an ionic macromolecule having a weight-average molecular weight of 100,000 or greater without a great decrease in the flux of permeation, and that this treatment not only recovered the rejection in the application to permeable membranes having a decreased rejection after the use but also increased the rejection in the application to unused permeable membranes. The present invention has been completed based on the knowledge.

The present invention provides:
(1) An agent for increasing rejection with a permeable membrane which comprises an ionic macromolecule having a weight-average molecular weight of 100,000 or greater;
(2) The agent for increasing rejection with a permeable membrane described in (1), wherein the permeable membrane is a nano filtration membrane or a reverse osmosis membrane;
(3) The agent for increasing rejection with a permeable membrane described in (1), wherein the ionic macromolecule is a cationic macromolecule;
(4) The agent for increasing rejection with a permeable membrane described in (3), wherein the cationic macromolecule has a heterocyclic ring;
(5) The agent for increasing rejection with a permeable membrane described in (4), wherein the cationic macromolecule having a heterocyclic ring is a polyvinylamidine or a derivative thereof;
(6) The agent for increasing rejection with a permeable membrane described in (1), wherein the ionic macromolecule is an anionic macromolecule;
(7) The agent for increasing rejection with a permeable membrane described in (6), wherein the anionic macromolecule is polyacrylic acid or a derivative thereof;
(8) The agent for increasing rejection with a permeable membrane described in (6), wherein the anionic macromolecule is polystyrenesulfonic acid or a derivative thereof;
(9) The agent for increasing rejection with a permeable membrane described in (1), which comprises a tracer for confirming the rejection comprising an inorganic electrolyte or an organic compound soluble in water;
(10) A process for increasing rejection with a permeable membrane which comprises treating the permeable membrane with the agent for increasing rejection with a permeable membrane described in any one of (1) to (9);
(11) The process for increasing rejection with a permeable membrane described in (10), wherein the permeable membrane is treated a plurality of times with the agent for increasing rejection with a permeable membrane;
(12) The process for increasing rejection with a permeable membrane described in (11), wherein the agent for increasing rejection with a permeable membrane described in any one of (3) to (5) and the agent for increasing rejection with a permeable membrane described in any one of (6) to (8) are used alternately;
(13) The process for increasing rejection with a permeable membrane described in any one of (10) to (12), wherein an aqueous solution comprising the agent for increasing rejection with a permeable membrane described in any one of (1) to (9) is passed through a module in which a permeable membrane is disposed;
(14) The process for increasing rejection with a permeable membrane described in any one of (10) to (13), wherein an unused permeable membrane or a permeable membrane having same rejection as a rejection with an unused permeable membrane is treated with the agent for increasing rejection with permeable membrane;
(15) The process for increasing rejection with a permeable membrane described in any one of (10) to (13), wherein a permeable membrane having a rejection decreased from a rejection with an unused permeable membrane is treated with the agent for increasing rejection with permeable membrane;
(16) A permeable membrane which is treated in accordance with the process for increasing rejection with a permeable membrane described in any one of (10) to (15); and
(17) A process for water treatment which comprises using the permeable membrane described in (16).

THE MOST PREFERRED EMBODIMENT TO CARRY OUT THE INVENTION

Figure 1:
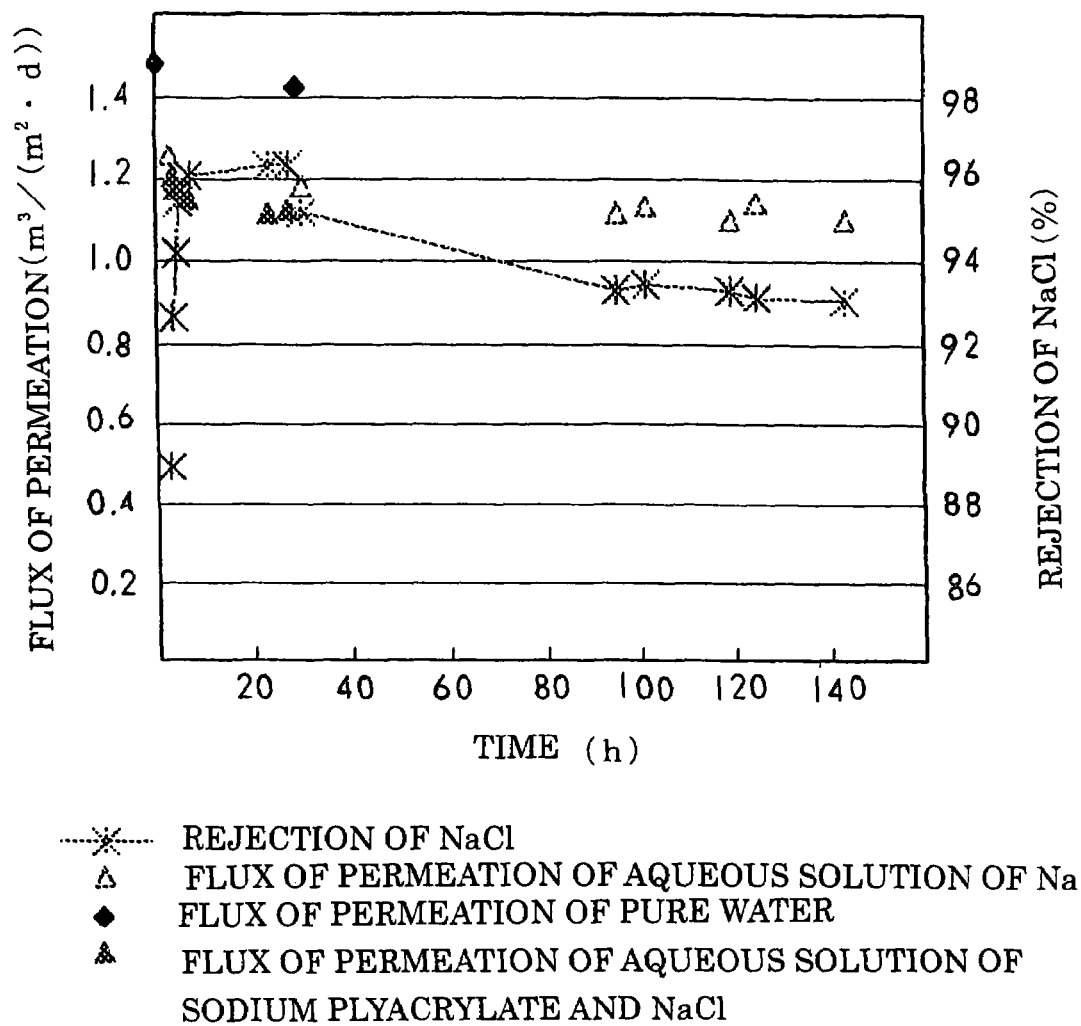
FIG. 1 shows a diagram exhibiting the change of the rejection of NaCl and the flux of permeation with time.

The agent for increasing the rejection with a permeable membrane of the present invention comprises an ionic macromolecule having a weight-average molecular weight of 100,000 or greater. In the present invention, it is preferable that the weight-average molecular weight of the ionic macromolecule is 300,000 or greater and more preferably 1,000,000 or greater. When the weight-average molecular weight of the ionic macromolecule is smaller than 100,000, it becomes difficult that the ionic macromolecule is adsorbed with the permeable membrane with stability and the stable adsorption is maintained for a long time, and there is the possibility that the rejection is not sufficiently increased. In the present invention, the weight-average molecular weight is obtained by analysis of an aqueous solution of the ionic macromolecule in accordance with the gel permeation chromatography, followed by calculation of the molecular weight expressed as that of the reference material of polyethylene oxide based on the obtained chromatogram. In the range of a great molecular weight where the reference material of polyethylene oxide is not available, the weight-average molecular weight is obtained in accordance with the light scattering method or the ultracentrifugal method.

The agent for increasing the rejection with a permeable membrane of the present invention can be advantageously applied to nano filtration membranes and reverse osmosis membranes. The nano filtration membrane to which the agent for increasing the rejection with a permeable membrane of the present invention is applied is a separation membrane for liquids which rejects permeation of particles having diameters of about 2 nm or smaller and macromolecules. Examples of the structure of the nano filtration membrane include inorganic membranes such as ceramic membranes and macromolecular membranes such as asymmetric membranes, composite membranes and electrically charged membranes. The reverse osmosis membrane is a separation membrane for liquids which rejects permeation of solutes and allows permeation of the solvent under application of a pressure greater than the difference in the osmotic pressure between solutions disposed via the membrane to the side having a greater concentration. Examples of the reverse osmosis membrane include macromolecular membranes such as asymmetric membranes and composite membranes. Examples of the material of the permeable membrane to which the agent for increasing the rejection of the present invention is applied include amide-based materials such as aromatic polyamides, aliphatic polyamides and composite materials based on these polyamides and cellulose-based materials such as cellulose acetate. Among these materials, aromatic polyamides are preferable. The agent for increasing the rejection of the present invention can be applied to any of unused permeable membranes and used permeable membranes. The module of the nano filtration membrane or the reverse osmosis membrane is not particularly limited. Examples of the module include tubular membrane modules, plate and frame membrane modules, spiral membrane modules and hollow fiber membrane modules.

The ionic macromolecule used for the agent for increasing the rejection with a permeable membrane of the present invention is not particularly limited. Examples of the ionic macromolecule include cationic macromolecules, anionic macromolecules and amphoteric macromolecules. Among these macromolecules, cationic macromolecules and anionic macromolecules are preferable. As for the amphoteric macromolecule, it is preferable that the amount of one of the cationic structural unit and the anionic structural unit is greater than the amount of the other, and the overall property of the macromolecule is not neutral but cationic or anionic.

Examples of the cationic macromolecule used in the present invention include primary amine compounds such as polyvinylamine, polyallylamine, polyacrylamide and chitosan, secondary amine compounds such as polyethyleneimine, tertiary amine compounds such as poly(dimethylaminoethyl acrylate) and poly(dimethylaminoethyl methacrylate), quaternary ammonium compounds such as compounds obtained by adding quaternary ammonium group to polystyrene and compounds having a heterocyclic ring such as polyvinylamidine, polyvinylpyridine, polypyrrol and polyvinyldiazole. Copolymers having a plurality of structures described above may be used as the cationic macromolecule. Among these compounds, compounds having a heterocyclic ring are preferable, and polyvinylamidine is more preferable.

Polyvinylamidine is a cationic macromolecule having the structural unit shown by general formula [1]. In general formula [1], $R^1$ to $R^4$ represent hydrogen atom or an alkyl group such as methyl group.

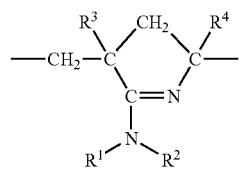
[1]

The cationic macromolecule having the structural unit represented by general formula [1] can be prepared by copolymerization of acrylonitrile or methacrylonitrile with N-vinylcarboxylic acid amide, N-isopropenylcarboxylic acid amide, N-vinylcarboxylic acid imide or N-isopropenylcarboxylic acid imide, followed by hydrolysis of the obtained copolymer to obtain an amidine. There is the possibility that the polyvinylamidine prepared as described above has cyano group derived from acrylonitrile or the like, carbamoyl group formed by hydrolysis of cyano group and amino group formed by hydrolysis of N-vinylcarboxylic acid amide unit or the like in addition to the structural unit represented by general formula [1]. As the commercial product, a cationic macromolecular flocculant manufactured by DIA-NITRIX Company "DIAFLOC (a registered trade mark) KP7000" can be used. Since nitrogen atom in the heterocyclic ring and nitrogen atom of the primary amine in the polyvinylamidine has the cationic property, the density of cation is great, and a great effect of increasing the rejection of cationic species in water is exhibited. In the case of other macromolecules having a heterocyclic ring, the density of cation can be increased by providing a cationic functional group such as a primary amine.

By the adsorption of the cationic macromolecule having a weight-average molecular weight of 100,000 or greater which exhibits the strong cationic property, for example, a macromolecule having the structure of a primary, secondary or tertiary amine or a quaternary ammonium salt in the structural unit such as the polyvinylamidine, to the surface of the permeable membrane, the rejection of cationic species in water can be effectively increased. Since, in general, the negative charge of the surface of the permeable membrane is great and the molecular weight of the cationic macromolecule is great, the macromolecule is adsorbed to the surface of the membrane with stability, and the rejection is increased. Since the cationic macromolecule exhibits an excellent hydrophilic property, the flux of permeation is not decreased to a great degree.

Examples of the anionic macromolecule used in the present invention include macromolecules having carboxyl group such as polyacrylic acid and polymethacrylic acid and macromolecules having sulfonic acid group such as polystyrenesulfonic acid, dextransulfuric acid and polyvinylsulfonic acid. Copolymers having a plurality of the above structures may be used as the anionic macromolecule. Since sulfonic acid group in polystyrenesulfonic acid exhibits the strong anionic property, the macromolecule is adsorbed to the surface of the permeable membrane with stability to increase the rejection, maintains the increased rejection for a long time and does not cause a great decrease in the flux of permeation.

On the surface of the permeable membrane, positive charges forming pairs with the negative charges are also present. In particular, the presence of the positive charge is significant in membranes having a decreased rejection such as membranes in which the amide bond is dissociated. Therefore, when the anionic macromolecule has interaction with the positive charge present on the surface of the membrane and has a weight-average molecular weight of 100,000 or greater, the bonded condition is maintained with more stability, and the effect of increasing the rejection of anionic species in water can be exhibited.

Procedures of increasing the rejection with a permeable membrane using a macromolecule have heretofore been conducted. However, when a macromolecule having no ionic property such as polyvinyl alcohol is used, the effect of increasing the rejection is not sufficient relative to the decrease in the flux of permeation, and stability of the increased condition is not sufficient, either. Dissolution of polyvinyl alcohol into water at the ordinary temperature becomes difficult when the weight-average molecular weight is 100,000 or greater, and a treatment at an elevated temperature of 40° C. or higher is necessary. When a macromolecule has a charge but has a small weight-average molecular weight, adsorption with the membrane takes place not only at coarse portions which cause the decrease in the rejection but also at dense portions of the membrane, and the effect of increasing the rejection is small relative to the decrease in the flux of permeation. There is the possibility that stability of the adsorbed condition is insufficient due to the small molecular weight.

When the rejection with a permeable membrane is improved by using polyvinyl alcohol or polyethylene glycol, the flux of permeation decreases to a great degree. The ionic macromolecule used for the agent for increasing the rejection of the present invention exhibits the excellent hydrophilic property due to the presence of charged groups, and the flux of permeation is not decreased to a great degree even when the molecular weight is great. It is necessary that the agent for increasing the rejection do not cause a marked decrease in the flux of permeation while the objects of increasing the rejection and realizing stable adsorption of the macromolecule with the membrane are achieved. Therefore, for deciding the macromolecule which can be used, it is preferable that $J/J_0 \geq 0.7$ is satisfied, wherein $J_0$ represents the flux of permeation through an unused membrane and J represents the flux of permeation through the membrane after the treatment for increasing the rejection. However, the operation for increasing the rejection with a membrane is not restricted by the above condition when the operation is conducted with proviso that the treated membrane is used as a membrane exhibiting different fundamental properties from that of the unused membrane, for example, when the rejection with a nano filtration membrane or a membrane resistant to chlorine having a small rejection is increased to a great degree.

In the agent for increasing the rejection with a permeable membrane of the present invention, the ionic macromolecule may be used as a salt having a counter ion. Examples of the salt having a counter ion include polyvinylamidine hydrochloride, sodium polyacrylate and sodium polystyrenesulfonate.

The agent for increasing the rejection with a permeable membrane of the present invention may comprise a tracer for confirming the rejection comprising an inorganic electrolyte or an organic substance soluble in water in combination with the ionic macromolecule. When water comprising a tracer in combination with the ionic macromolecule is passed through a permeable membrane, the rejection with the permeable membrane can be confirmed with the passage of the time, and it can be decided whether the treatment is continued or discontinued. When the concentration of the tracer in the permeating water reaches the prescribed value, it is decided that the rejection with the permeable membrane reached the prescribed value, and the treatment for increasing the rejection is completed. In accordance with this process, the contact between the aqueous solution of the agent for increasing the rejection and the permeable membrane can be controlled at the necessary and sufficient minimum time, and the normal operation using the permeable membrane can be resumed immediately. When a plurality of treatments for increasing the rejection are conducted using other agents for increasing the rejection, the plurality of treatment can be conducted efficiently without missing the suitable time for switching the operation. Examples of the inorganic electrolyte used as the tracer include sodium chloride. Examples of the organic compound soluble in water used as the tracer include isopropyl alcohol. It is preferable that the concentration of the tracer in water passing through the permeable membrane is 100 to 1,000 mg/liter and more preferably 300 to 700 mg/liter.

In the process for increasing the rejection with a permeable membrane of the present invention, the permeable membrane is treated with the agent for increasing the rejection with a permeable membrane of the present invention disclosed hereinabove. The process for treating the permeable membrane is not particularly limited. For example, an aqueous solution containing the agent for increasing the rejection is passed through a module in which the permeable membrane is disposed, or the permeable membrane may be dipped into an aqueous solution containing the agent for increasing the rejection. When the aqueous solution containing the agent for increasing the rejection is passed after the permeable membrane is mounted to the module or while the permeable membrane is kept disposed in the module, the aqueous solution containing the agent for increasing the rejection may be prepared from pure water, water passed through the permeable membrane or water for the treatment with the permeable membrane. When the aqueous solution containing the agent for increasing the rejection is prepared using water for the treatment with the permeable membrane, the change in the rejection with time can be confirmed by measuring the rejection of the components contained in the water for the treatment. The agent for increasing the rejection may be kept being injected into the water for the treatment.

The pressure for passing the aqueous solution containing the agent for increasing the rejection through the permeable membrane is not particularly limited. The treatment for increasing the rejection may be conducted under the pressure for passing the water for the treatment through the permeable membrane or a pressure smaller than this pressure. It is preferable that the concentration of the ionic macromolecule in the aqueous solution containing the agent for increasing rejection is 0.5 to 50 mg/liter and more preferably 1 to 10 mg/liter. When the concentration of the ionic macromolecule is smaller than 0.5 mg/liter, there is the possibility that it takes a long time for the treatment of increasing the rejection. When the concentration of the ionic macromolecule exceeds 50 mg/liter, viscosity of the aqueous solution increases, and there is the possibility that resistance in passing the solution through the permeable membrane increases. It is preferable that the time for passing the aqueous solution containing the agent for increasing the rejection is 1 to 48 hours and more preferably 2 to 24 hours. When the concentration of the ionic macromolecule in the aqueous solution is increased, there is the possibility that the flux of permeation decreases seriously although the time for passing the solution can be shortened.

When the treatment for increasing the rejection with the permeable membrane is conducted by dipping the membrane into a solution containing the agent for increasing the rejection, it is preferable that the concentration of the ionic macromolecule in the aqueous solution is 50 to 10,000 mg/liter and more preferably 100 to 5,000 mg/liter. It is preferable that the time of the dipping is 2 to 48 hours and more preferably 6 to 24 hours. When the dipping treatment has been completed, it is preferable that the permeable membrane is washed with water so that the ionic macromolecule remaining on the surface of the permeable membrane without being adsorbed is removed.

In the process for increasing the rejection with a permeable membrane of the present invention, the permeable membrane can be treated a plurality of times using the agents for increasing the rejection with a permeable membrane. By conducting a plurality of treatments for increasing the rejection, the improvement in the rejection, the stability of the increased rejection and the durability against substances contaminating the membrane can be enhanced. In the plurality of treatments, the same agent for increasing the rejection with a permeable membrane may be used repeatedly, or different agents for increasing the rejection with a permeable membrane may be used successively. By the adsorption of the ionic macromolecule to an aromatic polyamide membrane, the aromatic portion which tends to cause hydrophobic adsorption is covered, and adsorption of contaminating substances can be decreased. For example, after the rejection is greatly increased by adsorption of the ionic macromolecule having a greater molecular weight, the ionic macromolecule having a smaller molecular weight is adsorbed with gaps where the ionic macromolecule having a greater molecular weight is not adsorbed, and the rejection can be further increased in this manner. It is preferable that the weight-average molecular weight of the ionic macromolecule having a greater molecular weight is 1,000,000 to 10,000,000, and the weight-average molecular weight of the ionic macromolecule having a smaller molecular weight is 100,000 to 1,000,000.

In the process for increasing the rejection with a permeable membrane of the present invention, it is preferable that the permeable membrane is treated by using an agent for increasing the rejection comprising a cationic macromolecule and an agent for increasing the rejection comprising an anionic macromolecule alternately. The rejection can be increased by the alternate adsorption of the cationic macromolecule and the anionic macromolecule to the permeable membrane. Cations such as $Na^+$ and $Ca^{2+}$ derived from inorganic electrolytes in the water for the treatment is strongly rejected in the layer of the cationic macromolecule where the positive charge alone is present. When a layer of the anionic macromolecule is formed on the layer of the cationic macromolecule as the pair, each layer individually contributes to the rejection of cations and anions, and the rejection is increased. Moreover, as the result of strong interaction between the layer of the cationic macromolecule and the layer of the anionic macromolecule exhibited in a condition that these layers are adsorbed in a permeable membrane, the adsorbed condition of these layers is stabilized to suppress cleavage of these layers and the increased rejection is stabilized. By the alternate adsorption of the cationic macromolecule and the anionic macromolecule, the charge on the surface of the membrane does not become extremely positive or negative, and the adsorption layers can be stabilized while the hydrophilic property is maintained. Thus, the adsorption of substances contaminating the membrane can be suppressed, and the decrease in the flux of permeation due to the contaminating substances can be suppressed.

The process for increasing the rejection with a permeable membrane of the present invention can be applied to an unused permeable membrane or a permeable membrane having the same rejection as that of the unused permeable membrane. By treating the unused permeable membrane or the permeable membrane having the same rejection as that of the unused permeable membrane using the agent for increasing the rejection, the rejection is increased, and the decrease in the flux of permeation with time can be suppressed.

The process for increasing the rejection with a permeable membrane of the present invention can be applied to a permeable membrane having a rejection decreased from that of the unused permeable membrane. The rejection can be increased by treating the permeable membrane having a decreased rejection with the agent for increasing the rejection.

The permeable membrane having the rejection increased in accordance with the process of the present invention can be used while the membrane is kept at the module used for the treatment for increasing the rejection or after the membrane is detached from the above module and mounted to another module. When the permeable membrane detached from module A is mounted to module B, used for the treatment for increasing the rejection in module B, detached from module B and then mounted to module C, modules A, B and C may be the same with or different from each other. When the rejection is increased by the dipping, the operation of dipping the permeable membrane is conducted in place of the operation of mounting the permeable membrane to module B and passing water through module B.

The application of the permeable membrane treated in accordance with the process for increasing the rejection with a permeable membrane of the present invention is not particularly limited. Examples of the application include water systems in which a rejection greater than the rejection with the unused permeable membrane is required and systems for treating waste water in which the rejection with a permeable membrane decreased to a value smaller than that of the unused permeable membrane is recovered. In the process of the present invention, the requirement for the quality of the treated water in systems for treating waste water is satisfied since the rejection is increased by the adsorption of the ionic macromolecule. Moreover, the adsorption of contaminating substances in water for the treatment can be suppressed, and a flux of permeation greater than that of ordinary nano filtration membranes and reverse osmosis membranes can be obtained.

EXAMPLES

The present invention will be described more specifically with reference to examples in the following. However, the present invention is not limited to the examples.

In Examples and Comparative Examples, the rejection and the flux of permeation were obtained in accordance with the following methods.

(1) Rejection of Sodium Chloride

The electric conductivities of water for the treatment, water passed through a membrane and concentrated water were measured, and the rejection was calculated in accordance with the following equation:

rejection (%)={1−(2×electric conductivity of water passed through membrane)/(electric conductivity of water for treatment+electric conductivity of concentrated water)}×100

(2) Rejection of Isopropyl Alcohol rejection (%)={1−(2×TOC value of water passed through membrane)/(TOC value of water for treatment+TOC value of concentrated water)}×100

The concentration of isopropyl alcohol was set so that the contribution of other components including the ionic macromolecule to the TOC value was small (for example, about 2% of the TOC value of isopropyl alcohol). When the TOC component other than isopropyl alcohol is the ionic macromolecule alone, the rejection can be obtained more accurately by eliminating the contribution of the ionic macromolecule to the TOC value from the value of (TOC value of water for treatment+TOC value of concentrated water) in the above equation.

recovery (%)=(amount of treated water/amount of water for treatment)×100 contribution of ionic macromolecule to TOC value (mg/liter)=TOC value of ionic macromolecule added to water for treatment×{1+100/(100−recovery)}

(3) Flux of Permeation

Water passed through a membrane was collected for 1 hour, and the flux of permeation was calculated in accordance with the following equation:

flux of permeation $(m^3/(m^2 \cdot d))$=amount of water passed through membrane/(area of membrane× time of collection)

Comparative Example 1

A 10 mg/liter aqueous solution of polyvinyl alcohol having a weight-average molecular weight of 22,000 was passed through an aromatic polyamide membrane having a decreased rejection under a pressure of operation of 1.2 MPa for 20 hours. The flux of permeation decreased from 1.2 $m^3(m^2 \cdot d)$ to 0.6 $m^3(m^2 \cdot d)$ or smaller, and the rejection of NaCl in a 500 mg/liter aqueous solution of sodium chloride increased from 86% to 96%. The rejection of NaCl decreased to 95% after 24 hours and 94% after 96 hours. When the same procedures were conducted using a 1 mg/liter aqueous solution of polyvinyl alcohol, the rejection of NaCl increased only to 94% although the flux of permeation was 0.7 $m^3(m^2 \cdot d)$.

Comparative Example 2

A 1 mg/liter aqueous solution of polyethylene glycol having a weight-average molecular weight of 7,100 was passed through an aromatic polyamide membrane under a pressure of operation of 1.2 MPa for 20 hours. The flux of permeation decreased from 1.1 $m^3(m^2 \cdot d)$ to 0.4 $m^3(m^2 \cdot d)$ or smaller, and the rejection of NaCl in a 500 mg/liter aqueous solution of sodium chloride decreased from 99% to 98%. It was found that it is difficult to use a polyethylene glycol having a weight-average molecular weight of 7,100 could not be used as the agent for increasing the rejection since the flux of permeation and the rejection both decreased.

Comparative Example 3

A 1 mg/liter aqueous solution of polyethyleneimine, which was a cationic macromolecule, having a weight-average molecular weight of 10,000 was passed through an aromatic polyamide membrane having a rejection of NaCl in a 500 mg/liter aqueous solution of sodium chloride decreased to 88% and a flux of permeation of 1.3 $m^3(m^2 \cdot d)$ under 1.2 MPa for 20 hours. The rejection of NaCl was 90%, and the flux of permeation was 1.1 $m^3(m^2 \cdot d)$.

A 1 mg/liter aqueous solution of polyethyleneimine, which was a cationic macromolecule, having a weight-average molecular weight of 75,000 was passed through an aromatic polyamide membrane having a rejection of NaCl in a 500 mg/liter aqueous solution of sodium chloride decreased to 88% and a flux of permeation of 1.3 $m^3(m^2 \cdot d)$ under 1.2 MPa for 20 hours. The rejection of NaCl was 92%, and the flux of permeation was 1.0 $m^3(m^2 \cdot d)$. The rejection decreased to 90% after passing the aqueous solution of sodium chloride for 24 hours.

Comparative Example 4

A 1 mg/liter aqueous solution of chitosan, which was a cationic macromolecule, having a weight-average molecular weight of 16,000 was passed through an aromatic polyamide membrane having a rejection of NaCl in a 500 mg/liter aqueous solution of sodium chloride decreased to 88% and a flux of permeation of 1.2 $m^3(m^2 \cdot d)$ under 1.2 MPa for 20 hours. The rejection of NaCl was 89%, and the flux of permeation was 1.1 $m^3(m^2 \cdot d)$.

A 1 mg/liter aqueous solution of chitosan, which was a cationic macromolecule, having a weight-average molecular weight of 80,000 was passed through an aromatic polyamide membrane having a rejection of NaCl in a 500 mg/liter aqueous solution of sodium chloride decreased to 88% and a flux of permeation of 1.2 $m^3(m^2 \cdot d)$ under 1.2 MPa for 20 hours. The rejection of NaCl was 91%, and the flux of permeation was 1.0 $m^3(m^2 \cdot d)$.

Example 1

A 1 mg/liter aqueous solution of chitosan, which was a cationic macromolecule, having a weight-average molecular weight of 160,000 was passed through an aromatic polyamide membrane having a rejection of NaCl in a 500 mg/liter aqueous solution of sodium chloride decreased to 88% and a flux of permeation of 1.2 $m^3(m^2 \cdot d)$ under 1.2 MPa for 20 hours. The rejection of NaCl was 94%, and the flux of permeation was 0.9 $m^3(m^2 \cdot d)$. The rejection of NaCl was maintained at 94% after passing the aqueous solution of sodium chloride for 96 hours.

Example 2

A 1 mg/liter aqueous solution of polyvinylpyridine, which was a cationic macromolecule, having a weight-average molecular weight of 160,000 was passed through an aromatic polyamide membrane having a rejection of NaCl in a 500 mg/liter aqueous solution of sodium chloride decreased to 88% and a flux of permeation of 1.2 $m^3(m^2 \cdot d)$ under 1.2 MPa for 20 hours. The rejection of NaCl was 93%, and the flux of permeation was 1.0 $m^3(m^2 \cdot d)$.

The results of Examples 1 and 2 and Comparative Examples 3 and 4 are shown in Table 1.

TABLE 1

| | Macromolecule | Weight-average molecular weight | Rejection of NaCl (%) | | Flux of permeation $(m^3/m^2 \cdot d)$ | |
|---|---|---|---|---|---|---|
| | | | before treatment | after treatment | before treatment | after treatment |
| Comparative Example 3 | polyethyleneimine | 10,000 | 88 | 90 | 1.3 | 1.1 |
| | | 75,000 | 88 | 92 | 1.3 | 1.0 |
| Comparative Example 4 | chitosan | 16,000 | 88 | 89 | 1.2 | 1.1 |
| | | 80,000 | 88 | 91 | 1.2 | 1.0 |

TABLE 1-continued

|  | Macromolecule | Weight-average molecular weight | Rejection of NaCl (%) | | Flux of permeation (m³/m²·d) | |
|---|---|---|---|---|---|---|
|  |  |  | before treatment | after treatment | before treatment | after treatment |
| Example 1 | chitosan | 160,000 | 88 | 94 | 1.2 | 0.9 |
| Example 2 | polyvinyl-pyridine | 160,000 | 88 | 93 | 1.2 | 1.0 |

(The concentration of the aqueous solution of the macromolecule: 1 mg/liter; the time of passing the solution: 20 hours)

As shown in Table 1, the rejection of NaCl increased by 2 to 4% and the flux of permeation decreased by 0.2 to 0.3 m³(m²·d) when polyethyleneimine having a weight-average molecular weight of 10,000 or 75,000 was used. The rejection of NaCl increased by 1 to 3% and the flux of permeation decreased by 0.1 to 0.2 m³(m²·d) when chitosan having a weight-average molecular weight of 16,000 or 80,000 was used. The rejection of NaCl increased by 5% or greater and the flux of permeation decreased by 0.2 to 0.3 m³(m²·d) when chitosan or polyvinylpyridine having a weight-average molecular weight of 160,000 was used. When polyethyleneimine having a weight-average molecular weight of 75,000 was used, the rejection of NaCl decreased to 90% when the aqueous solution of sodium chloride was passed for 24 hours after the treatment. In contrast, when chitosan having a weight-average molecular weight of 160,000 was used, the rejection of NaCl was kept at 94% when the aqueous solution of sodium chloride was passed for 96 hours after the treatment. It is shown that the effect of increasing the rejection and the stability in the treatment for increasing the rejection are enhanced by using the cationic macromolecule having a molecular weight of 100,000 or greater.

Example 3

A 1 mg/liter aqueous solution of polyvinylamidine, which was a cationic macromolecule, having a weight-average molecular weight of 3,500,000 was passed through an aromatic polyamide membrane having a rejection of NaCl in a 500 mg/liter aqueous solution of sodium chloride decreased to 86% and a flux of permeation of 1.2 m³(m²·d) under 1.2 MPa for 20 hours. The rejection of NaCl was 96%, and the flux of permeation was 0.8 m³(m²·d). The rejection of NaCl was maintained with stability and did not change after 120 hours.

A 10 mg/liter aqueous solution of polyvinylamidine, which was a cationic macromolecule, having a weight-average molecular weight of 3,500,000 was passed through an aromatic polyamide membrane having a rejection of NaCl in a 500 mg/liter aqueous solution of sodium chloride decreased to 86% and a flux of permeation of 1.3 m³(m²·d) under 1.2 MPa for 20 hours. The rejection of NaCl was 96%, and the flux of permeation was 0.6 m³(m²·d). The rejection of NaCl was maintained with stability and did not change after 120 hours.

The results of Example 3 are shown in Table 2.

TABLE 2

|  | Concentration of aqueous solution of polyvinylamidine (mg/liter) | Rejection of NaCl (%) | | Flux of permeation (m³/m²·d) | |
|---|---|---|---|---|---|
|  |  | before treatment | after treatment | before treatment | after treatment |
| Example 3 | 1 | 86 | 96 | 1.2 | 0.8 |
|  | 10 | 86 | 96 | 1.3 | 0.6 |

(The weight-average molecular weight: 3,500,000; the time of passing the solution: 20 hours)

As shown in Table 2, the rejection of NaCl increased from 86% to 96% by passing the aqueous solution of polyvinylamidine having a concentration of 1 mg/liter or 10 mg/liter, was maintained with stability and did not change after 120 hours in both cases of the concentration. It is shown that the more excellent effect of increasing the rejection and stability than those obtained by using polyvinyl alcohol in Comparative Example 1 could be obtained although the cationic macromolecule having a weight-average molecular weight of 1,000,000 or greater showed a greater decrease in the flux of permeation than that of the polymer having a weight-average molecular weight of the order of 100,000.

Example 4

A 0.2 mg/liter aqueous solution of sodium polystyrenesulfonate, which was an anionic macromolecule, having a weight-average molecular weight of 3,000,000 was passed through an aromatic polyamide membrane having a rejection of NaCl in a 500 mg/liter aqueous solution of sodium chloride decreased to 84% and a flux of permeation of 1.3 m³(m²·d) under 1.2 MPa for 20 hours. The rejection of NaCl was 88%, and the flux of permeation was 1.1 m³(m²·d).

A 1 mg/liter aqueous solution of sodium polystyrenesulfonate, which was an anionic macromolecule, having a weight-average molecular weight of 3,000,000 was passed through an aromatic polyamide membrane having a rejection of NaCl in a 500 mg/liter aqueous solution of sodium chloride decreased to 84% and a flux of permeation of 1.4 m³(m²·d) under 1.2 MPa for 20 hours. The rejection of NaCl was 92%, and the flux of permeation was 1.1 m³(m²·d).

A 10 mg/liter aqueous solution of sodium polystyrenesulfonate, which was an anionic macromolecule, having a weight-average molecular weight of 3,000,000 was passed through an aromatic polyamide membrane having a rejection of NaCl in a 500 mg/liter aqueous solution of sodium chloride decreased to 84% and a flux of permeation of 1.4 m³(m²·d) under 1.2 MPa for 20 hours. The rejection of NaCl was 94%, and the flux of permeation was 1.0 m³(m²·d).

The results of Example 4 are shown in Table 3.

TABLE 3

| | Concentration of aqueous solution of sodium polystyrenesulfonate (mg/liter) | Rejection of NaCl (%) | | Flux of permeation (m³/m²·d) | |
|---|---|---|---|---|---|
| | | before treatment | after treatment | before treatment | after treatment |
| Example 4 | 0.2 | 84 | 88 | 1.3 | 1.1 |
| | 1 | 84 | 92 | 1.4 | 1.1 |
| | 10 | 84 | 94 | 1.4 | 1.0 |

(The weight-average molecular weight: 3,000,000; the time of passing the solution: 20 hours)

As shown in Table 3, the rejection of NaCl increased when the 0.2 mg/liter solution, the 1 mg/liter solution or the 10 mg/liter solution of sodium polystyrenesulfonate was passed.

Comparative Example 5

A 10 mg/liter aqueous solution of sodium polystyrenesulfonate, which was an anionic macromolecule, having a weight-average molecular weight of 50,000 was passed through an aromatic polyamide membrane having a rejection of NaCl in a 500 mg/liter aqueous solution of sodium chloride decreased to 88% and a flux of permeation of 1.2 m³(m²·d) under 1.2 MPa for 20 hours. The rejection of NaCl was 88%, and the flux of permeation was 1.2 m³(m²·d). Neither the rejection of NaCl nor the flux of permeation changed.

Example 5

A 10 mg/liter aqueous solution of sodium polystyrenesulfonate, which was an anionic macromolecule, having a weight-average molecular weight of 100,000 was passed through an aromatic polyamide membrane having a rejection of NaCl in a 500 mg/liter aqueous solution of sodium chloride decreased to 89% and a flux of permeation of 1.2 m³(m²·d) under 1.2 MPa for 20 hours. The rejection of NaCl was 92%, and the flux of permeation was 1.1 m³(m²·d).

A 10 mg/liter aqueous solution of sodium polystyrenesulfonate, which was an anionic macromolecule, having a weight-average molecular weight of 150,000 was passed through an aromatic polyamide membrane having a rejection of NaCl in a 500 mg/liter aqueous solution of sodium chloride decreased to 87% and a flux of permeation of 1.2 m³(m²·d) under 1.2 MPa for 20 hours. The rejection of NaCl was 94%, and the flux of permeation was 1.1 m³(m²·d).

A 10 mg/liter aqueous solution of sodium polystyrenesulfonate, which was an anionic macromolecule, having a weight-average molecular weight of 1,000,000 was passed through an aromatic polyamide membrane having a rejection of NaCl in a 500 mg/liter aqueous solution of sodium chloride decreased to 89% and a flux of permeation of 1.2 m³(m²·d) under 1.2 MPa for 20 hours. The rejection of NaCl was 94%, and the flux of permeation was 1.1 m³(m²·d).

A 10 mg/liter aqueous solution of sodium polystyrenesulfonate, which was an anionic macromolecule, having a weight-average molecular weight of 3,000,000 was passed through an aromatic polyamide membrane having a rejection of NaCl in a 500 mg/liter aqueous solution of sodium chloride decreased to 89% and a flux of permeation of 1.1 m³(m²·d) under 1.2 MPa for 20 hours. The rejection of NaCl was 95%, and the flux of permeation was 1.0 m³(m²·d).

Comparative Example 6

A 10 mg/liter aqueous solution of sodium dextransulfate, which was an anionic macromolecule, having a weight-average molecular weight of 40,000 was passed through an aromatic polyamide membrane having a rejection of NaCl in a 500 mg/liter aqueous solution of sodium chloride decreased to 89% and a flux of permeation of 1.3 m³(m²·d) under 1.2 MPa for 20 hours. The rejection of NaCl was 89%, and the flux of permeation was 1.3 m³(m²·d). Neither the rejection of NaCl nor the flux of permeation changed.

Example 6

A 10 mg/liter aqueous solution of sodium dextransulfate, which was an anionic macromolecule, having a weight-average molecular weight of 100,000 was passed through an aromatic polyamide membrane having a rejection of NaCl in a 500 mg/liter aqueous solution of sodium chloride decreased to 88% and a flux of permeation of 1.2 m³(m²·d) under 1.2 MPa for 20 hours. The rejection of NaCl was 90%, and the flux of permeation was 1.1 m³(m²·d).

A 10 mg/liter aqueous solution of sodium dextransulfate, which was an anionic macromolecule, having a weight-average molecular weight of 500,000 was passed through an aromatic polyamide membrane having a rejection of NaCl in a 500 mg/liter aqueous solution of sodium chloride decreased to 88% and a flux of permeation of 1.4 m³(m²·d) under 1.2 MPa for 20 hours. The rejection of NaCl was 92%, and the flux of permeation was 1.2 m³(m²·d).

A 10 mg/liter aqueous solution of sodium dextransulfate, which was an anionic macromolecule, having a weight-average molecular weight of 1,400,000 was passed through an aromatic polyamide membrane having a rejection of NaCl in a 500 mg/liter aqueous solution of sodium chloride decreased to 89% and a flux of permeation of 1.2 m³(m²·d) under a pressure of operation of 1.2 MPa for 20 hours. The rejection of NaCl was 94%, and the flux of permeation was 1.0 m³(m²·d).

Comparative Example 7

A 10 mg/liter aqueous solution of sodium polyacrylate, which was an anionic macromolecule, having a weight-average molecular weight of 50,000 was passed through an aromatic polyamide membrane having a rejection of NaCl in a 500 mg/liter aqueous solution of sodium chloride decreased to 87% and a flux of permeation of 1.3 m³(m²·d) under 1.2 MPa for 20 hours. The rejection of NaCl was 89%, and the flux of permeation was 1.2 m³(m²·d).

Example 7

A 10 mg/liter aqueous solution of sodium polyacrylate, which was an anionic macromolecule, having a weight-average molecular weight of 100,000 was passed through an aromatic polyamide membrane having a rejection of NaCl in a 500 mg/liter aqueous solution of sodium chloride decreased to 88% and a flux of permeation of 1.2 m³(m²·d) under 1.2 MPa for 20 hours. The rejection of NaCl was 92%, and the flux of permeation was 1.0 m³(m²·d).

A 10 mg/liter aqueous solution of sodium polyacrylate, which was an anionic macromolecule, having a weight-average molecular weight of 1,000,000 was passed through an aromatic polyamide membrane having a rejection of NaCl in a 500 mg/liter aqueous solution of sodium chloride decreased to 87% and a flux of permeation of 1.2 m³(m²·d) under 1.2 MPa for 20 hours. The rejection of NaCl was 96%, and the flux of permeation was 0.8 m³(m²·d).

A 10 mg/liter aqueous solution of sodium polyacrylate, which was an anionic macromolecule, having a weight-average molecular weight of 6,000,000 was passed through an aromatic polyamide membrane having a rejection of NaCl in a 500 mg/liter aqueous solution of sodium chloride decreased to 89% and a flux of permeation of 1.3 m³(m²·d) under 1.2 MPa for 20 hours. The rejection of NaCl was 95%, and the flux of permeation was 1.2 m³(m²·d).

The results of Examples 5 to 7 and Comparative Example 5 to 7 are shown in Table 4.

TABLE 4

|  | Macromolecule | Weight-average molecular weight | Rejection of NaCl (%) before treatment | Rejection of NaCl (%) after treatment | Flux of permeation (m³/m²·d) before treatment | Flux of permeation (m³/m²·d) after treatment |
|---|---|---|---|---|---|---|
| Comparative Example 5 | sodium polystyrenesulfonate | 50,000 | 88 | 88 | 1.2 | 1.2 |
| Example 5 | sodium polystyrenesulfonate | 100,000 | 89 | 92 | 1.2 | 1.1 |
|  |  | 150,000 | 87 | 94 | 1.2 | 1.1 |
|  |  | 1,000,000 | 89 | 94 | 1.2 | 1.0 |
|  |  | 3,000,000 | 89 | 95 | 1.1 | 1.0 |
| Comparative Example 6 | sodium dextransulfate | 40,000 | 89 | 89 | 1.3 | 1.3 |
| Example 6 | sodium dextransulfate | 100,000 | 88 | 90 | 1.2 | 1.1 |
|  |  | 500,000 | 88 | 92 | 1.4 | 1.2 |
|  |  | 1,400,000 | 89 | 94 | 1.2 | 1.0 |
| Comparative Example 7 | sodium polyacrylate | 50,000 | 87 | 89 | 1.3 | 1.2 |
| Example 7 | sodium polyacrylate | 100,000 | 88 | 92 | 1.2 | 1.0 |
|  |  | 1,000,000 | 87 | 96 | 1.2 | 0.8 |
|  |  | 6,000,000 | 89 | 95 | 1.3 | 1.2 |

(The concentration of the aqueous solution of the macromolecule: 10 mg/liter; the time of passing the solution: 20 hours)

As shown in Table 4, the rejection of NaCl with an aromatic polyamide membrane having a rejection of NaCl decreased to 87 to 89% increased to 90 to 96% by passing the aqueous solution of sodium polystyrenesulfonate, sodium dextransulfate or sodium polyacrylate, which are anionic macromolecules, having a weight-average molecular weight of 100,000 or greater. A greater weight-average molecular weight of the anionic macromolecule tends to show a greater effect of increasing the rejection. In particular, in the case of sodium polystyrenesulfonate having a weight-average molecular weight of 3,000,000 and sodium polyacrylate having a weight-average molecular weight of 6,000,000, the rejection increased to 95% without a great decrease in the flux of permeation. The rejection of NaCl showed no or only a small improvement when the weight-average molecular weight of the anionic macromolecule was 40,000 or 50,000.

Example 8

The treatment for increasing the rejection was conducted by passing an aqueous solution containing 10 mg/liter of sodium polyacrylate having a weight-average molecular weight of 6,000,000, which was an anionic macromolecule, and 500 mg/liter of sodium chloride through an aromatic polyamide membrane having a rejection of NaCl in a 500 mg/liter aqueous solution of sodium chloride decreased to 89% and a flux of permeation of 1.2 m³(m²·d) under 1.2 MPa for 20 hours. The changes in the rejection of sodium chloride and the flux of permeation with time are shown in FIG. 1. The rejection of NaCl reached to 96% or greater and the flux of permeation became 1.1 m³(m²·d) after passing the aqueous solution of sodium polyacrylate and sodium chloride for 20 hours. Thereafter, pure water was passed through the membrane and, then, a 500 mg/liter aqueous solution of sodium chloride was passed through the membrane for 100 hours or longer. The rejection of NaCl gradually decreased to 93% although no change in the flux of permeation was found. It is shown that, in comparison with the effect exhibited with the cationic macromolecule, the anionic macromolecule exhibited a smaller decrease in the flux of permeation even when the concentration was increased 10 times, and the effect of increasing the rejection and the stability are slightly inferior.

Example 9

The treatment for increasing the rejection of an aromatic polyamide membrane exhibiting a decreased rejection of NaCl was conducted by passing an aqueous solution of an anionic macromolecule and an aqueous solution of a cationic macromolecule, successively.

Figure 2:
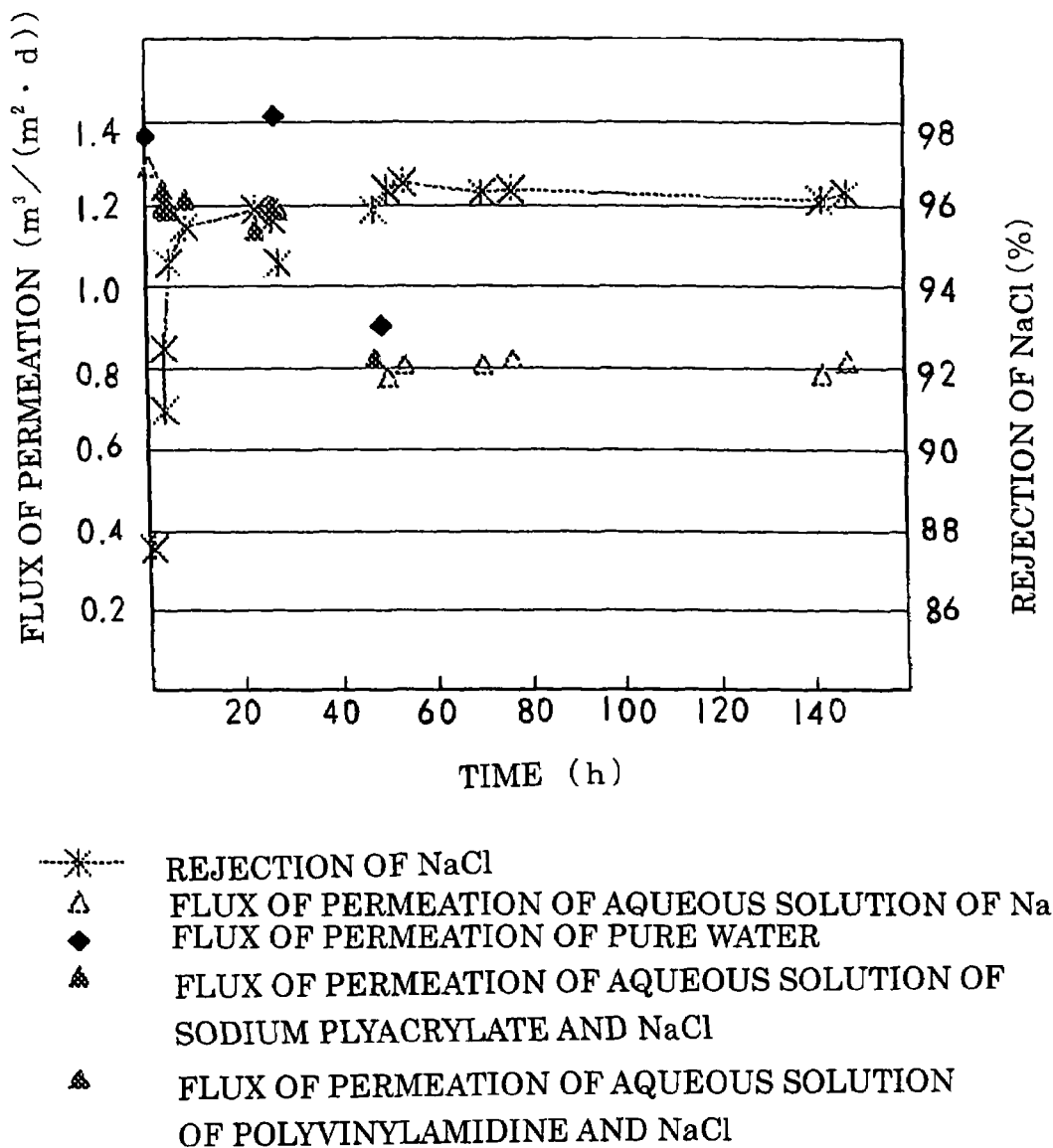
FIG. 2 shows a diagram exhibiting the change of the rejection of NaCl and the flux of permeation with time.

An aqueous solution containing 10 mg/liter of sodium polyacrylate having a weight-average molecular weight of 6,000,000 and 500 mg/liter of sodium chloride was passed through an aromatic polyamide membrane having a rejection of NaCl in a 500 mg/liter aqueous solution of sodium chloride decreased to 87.5% under 1.2 MPa for 20 hours, and the properties for passing pure water and a 500 mg/liter aqueous solution of sodium chloride through the membrane were evaluated. Thereafter, an aqueous solution containing 1 mg/liter of polyvinylamidine having a weight-average molecular weight of 3,500,000 and 500 mg/liter of sodium chloride was passed under 1.2 MPa for 20 hours, and pure water was passed. Then, a 500 mg/liter aqueous solution of sodium chloride was passed for 100 hours or longer. Due to the operation of increasing the rejection by the plurality of solutions, the rejection of NaCl exceeded 96%, and this value was maintained while the aqueous solution of NaCl was passed for 100 hours or longer in the last step. FIG. 2 shows a diagram exhibiting the changes of the rejection of NaCl and the flux of permeation with time.

In other words, the characteristics of the anionic macromolecule that the decrease in the flux of permeation was small and the characteristics of the cationic macromolecule that the rejection was increased and stability was exhibited were both obtained, and the stability could be further enhanced by the alternate adsorption of the anionic macromolecule and the cationic macromolecule.

Example 10

The treatment for increasing the rejection was conducted by passing an aqueous solution of an anionic macromolecule and an aqueous solution of a cationic macromolecule, successively, through an aromatic polyamide low pressure membrane having a rejection of NaCl in a 500 mg/liter aqueous solution of sodium chloride of 97% and a flux of permeation of 0.9 m$^3$(m$^2$·d).

An aqueous solution containing 10 mg/liter of sodium polyacrylate having a weight-average molecular weight of 6,000,000 and 500 mg/liter of sodium chloride was passed under 1.2 MPa for 4 hours, and pure water and a 500 mg/liter aqueous solution of sodium chloride were passed. Thereafter, an aqueous solution containing 1 mg/liter of polyvinylamidine having a weight-average molecular weight of 3,500,000 and 500 mg/liter of sodium chloride was passed under 1.2 MPa for 4 hours. Then, after pure water was passed, a 500 mg/liter aqueous solution of sodium chloride was passed.

The rejection was 99%, and the flux of permeation was 0.7 m$^3$(m$^2$·d).

Example 11

The treatment for increasing the rejection was conducted by passing an aqueous solution of an anionic macromolecule and an aqueous solution of a cationic macromolecule, successively, through an aromatic polyamide low pressure membrane having a rejection of NaCl in a 500 mg/liter aqueous solution of sodium chloride of 94% and a flux of permeation of 0.9 m$^3$(m$^2$·d).

An aqueous solution containing 10 mg/liter of sodium polyacrylate having a weight-average molecular weight of 6,000,000 and 500 mg/liter of sodium chloride was passed under 0.75 MPa for 4 hours, and pure water and a 500 mg/liter aqueous solution of sodium chloride were passed. Thereafter, an aqueous solution containing 1 mg/liter of polyvinylamidine having a weight-average molecular weight of 3,500,000 and 500 mg/liter of sodium chloride was passed under 0.75 MPa for 4 hours. Then, after pure water passed, a 500 mg/liter aqueous solution of sodium chloride was passed.

The rejection was 98%, and the flux of permeation was 0.7 m$^3$(m$^2$·d).

The results of Examples 10 and 11 are shown in Table 5.

molecule, successively, through the aromatic polyamide membrane exhibiting the rejection of 97% and 94%, respectively.

Example 12

Figure 3:
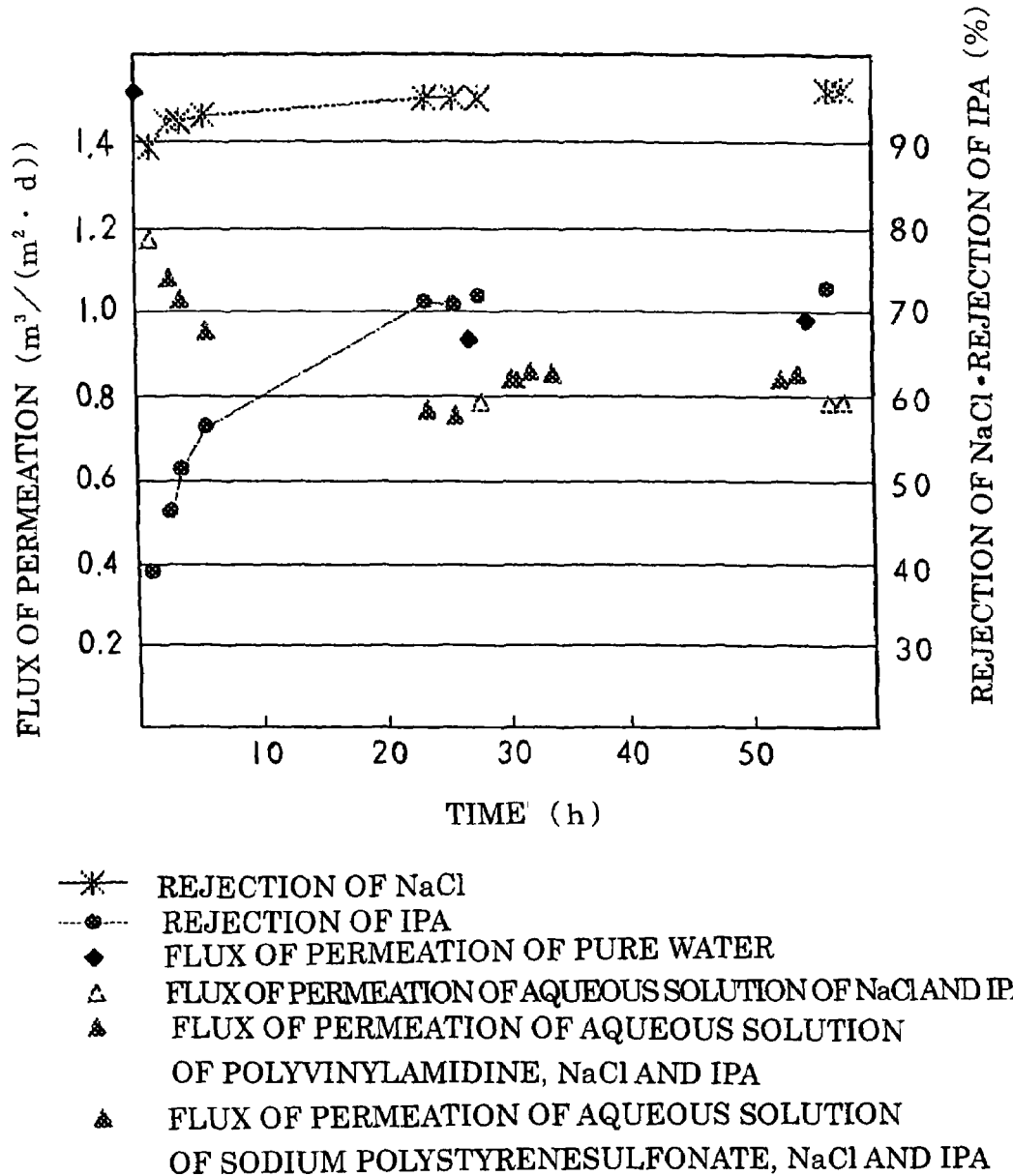
FIG. 3 shows a diagram exhibiting the change of the rejection of NaCl, the rejection of IPA and the flux of permeation with time.

An aqueous solution containing 1 mg/liter of polyvinylamidine having a weight-average molecular weight of 3,500,000, 500 mg/liter of sodium chloride and 1,000 mg/liter of isopropyl alcohol (IPA) was passed through an aromatic polyamide membrane having a rejection of NaCl of 88% and a rejection of IPA of 38% in an aqueous solution containing 500 mg/liter of sodium chloride and 1,000 mg/liter of isopropyl alcohol under 1.2 MPa for 24 hours, and the properties for passing pure water, the 500 mg/liter aqueous solution of sodium chloride and the 1,000 mg/liter aqueous solution of isopropyl alcohol through the membrane were evaluated. Thereafter, an aqueous solution containing 1 mg/liter of sodium polystyrenesulfonate having a weight-average molecular weight of 3,000,000, 500 mg/liter of sodium chloride and 1,000 mg/liter of isopropyl alcohol was passed under 1.2 MPa for 24 hours. Then, after pure water was passed, a 500 mg/liter aqueous solution of sodium chloride and a 1,000 mg/liter aqueous solution of isopropyl alcohol were passed. FIG. 3 shows a diagram exhibiting the changes of the flux of permeation, the rejection of NaCl and the rejection of IPA with time.

Due to the operation for increasing the rejection with the plurality of aqueous solutions, the rejection of NaCl reached 99%, and the rejection of IPA reached 73%. By passing the aqueous solution of the anionic macromolecule after passing the aqueous solution of the cationic macromolecule, the rejection of NaCl and the rejection of IPA could be further increased by about 1% without decreasing the flux of permeation, and the stability of the membrane treated for increasing the rejection could be enhanced.

Example 13

Organic waste water containing 1 mg/liter of heptaethylene glycol monododecyl ether, which was a surfactant of the alkyl ether type, was passed under a pressure of operation of 1.2 MPa through an unused aromatic polyamide membrane having a rejection of NaCl in a 500 mg/liter aqueous solution of

TABLE 5

| | Reverse osmosis membrane | pressure of operation (MPa) | Rejection of NaCl (%) before treatment | Rejection of NaCl (%) after treatment | Flux of permeation (m$^3$/m$^2$·d) before treatment | Flux of permeation (m$^3$/m$^2$·d) after treatment |
|---|---|---|---|---|---|---|
| Example 10 | aromatic polyamide low pressure membrane | 1.2 | 97 | 99 | 0.9 | 0.7 |
| Example 11 | aromatic polyamide ultra-low pressure membrane | 0.75 | 94 | 98 | 0.9 | 0.7 |

(An aqueous solution containing sodium polyacrylate having a weight-average molecular weight of 6,000,000 and sodium chloride and an aqueous solution containing polyvinylamidine having a weight-average molecular weight of 3,500,000 and sodium chloride were passed successively.)

As shown in Table 5, the rejection of NaCl increased to 99% and 98% without marked decreases in the flux of permeation by passing the aqueous solution of the anionic macromolecule and the aqueous solution of the cationic macrosodium chloride of 99% and a flux of permeation of 0.9 m$^3$(m$^2$·d) or a membrane treated for increasing the rejection which had a flux of permeation of 0.9 m$^3$(m$^2$·d) and a rejection of NaCl increased to 98% in accordance with the same procedures as those in Example 10 by passing an aqueous solution containing 10 mg/liter of sodium polyacrylate having a weight-average molecular weight of 6,000,000 and 500 mg/liter of sodium chloride and an aqueous solution containing 1 mg/liter of polyvinylamidine having a weight-average molecular weight of 3,500,000 and 500 mg/liter of sodium chloride successively through the same aromatic polyamide membrane as the above membrane except that the rejection was decreased to 94% by oxidation, and the change in the flux of permeation with time was measured.

Figure 4:
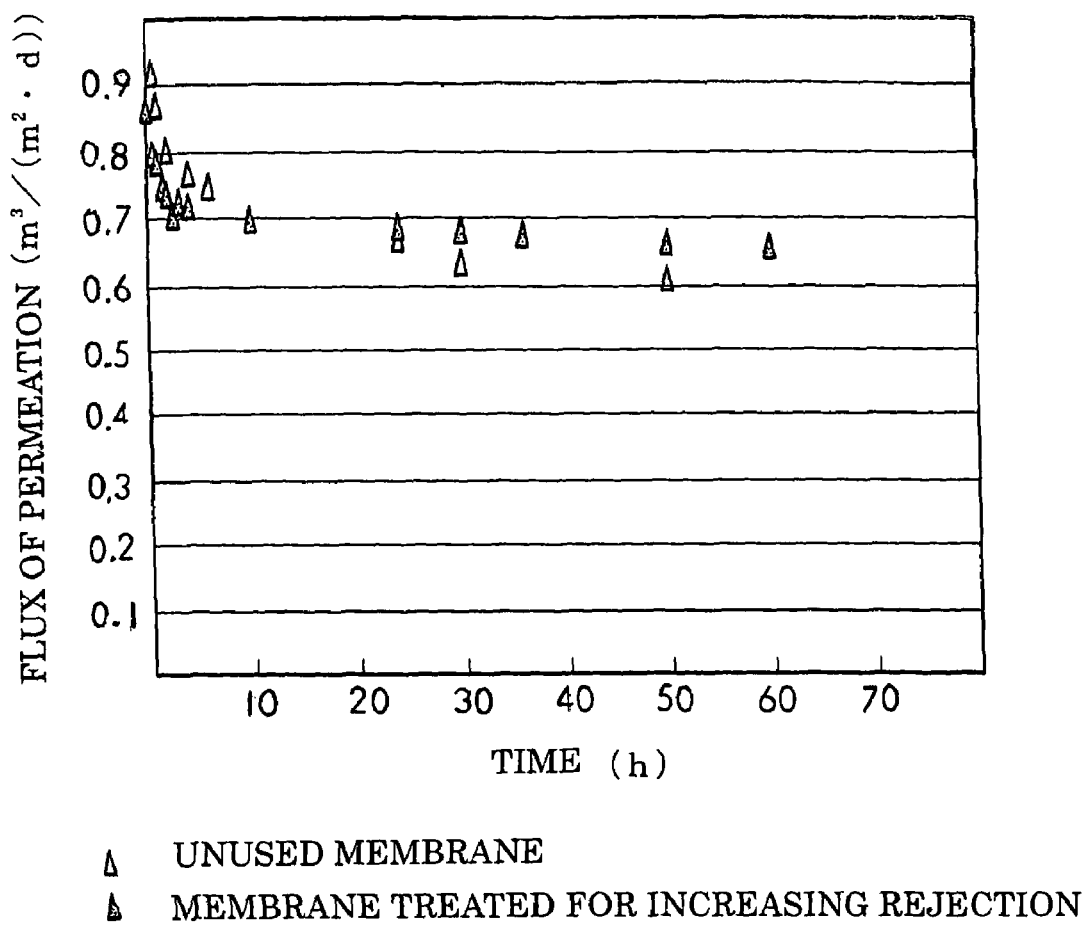
FIG. 4 shows a diagram exhibiting the change of the flux of permeation with time.

The result is shown in FIG. 4. Although the membrane treated for increasing the rejection had a flux of permeation smaller than that of the unused membrane in the initial period of passing water, the membrane treated for increasing the rejection had a greater flux of permeation due to the suppressed decrease in the flux of permeation after 24 hours. This result is considered to be obtained since dense portions of the unused membrane were partially replaced with the macromolecule used for the treatment for increasing the rejection, and the surface of the membrane was covered with the hydrophilic ionic macromolecule to make adsorption of nonionic surfactants of the contaminating substance difficult.

Example 14

The treatment for increasing the rejection with a polyamide-based nano filtration membrane was conducted.

An aqueous solution containing 10 mg/liter of sodium polyarylate having a weight-average molecular weight of 6,000,000 and 500 mg/liter of sodium chloride was passed through a polyamide-based nano filtration membrane having a rejection of NaCl in a 500 mg/liter aqueous solution of sodium chloride decreased to 85% and a flux of permeation of 1.3 m$^3$(m$^2$·d) under 0.5 MPa for 20 hours. Pure water and a 500 mg/liter aqueous solution of sodium chloride were passed, and an aqueous solution containing 1 mg/liter of polyvinylamidine having a molecular weight of 3,500,000 and 500 mg/liter of sodium chloride was passed under 0.5 MPa for 4 hours. Pure water was passed, and the property for passing a 500 mg/liter aqueous solution of sodium chloride was evaluated.

Thereafter, the passage of the aqueous solution of sodium polyacrylate and sodium chloride, the passage of pure water, the passage of the aqueous solution of sodium chloride, the passage of the aqueous solution of polyvinylamidine and sodium chloride and the passage of pure water were repeated in accordance with the same procedures as those conducted above and, then, a 500 mg/liter aqueous solution of sodium chloride was passed for 50 hours.

The rejection of NaCl was 93% and the flux of permeation was 0.9 m$^3$(m$^2$·d) after the first treatments with the aqueous solution of polyacrylic acid and sodium chloride and the aqueous solution of polyvinylamidine and sodium chloride. The rejection of NaCl was 96% and the flux of permeation was 0.7 m$^3$(m$^2$·d) after the second treatments with the aqueous solution of polyacrylic acid and sodium chloride and the aqueous solution of polyvinylamidine and sodium chloride. The rejection obtained after the two treatments was maintained for 50 hours.

INDUSTRIAL APPLICABILITY

In the membrane separation using a selective permeable membrane such as a nano filtration membrane and a reverse osmosis membrane, the rejection of inorganic electrolytes and organic compounds soluble in water can be increased easily and safely at the location of the use of the membrane without extreme decrease in the flux, and the increased rejection can be maintained for a long time by using the agent for increasing the rejection with a permeable membrane and in accordance with the process for increasing the rejection with a permeable membrane of the present invention. By using the permeable membrane and in accordance with the process for the water treatment of the present invention, not only inorganic electrolytes but also organic substances soluble in water which are present in water can be effectively separated while the rejection and the flux of permeation can be maintained at great values for a long time.

The invention claimed is:

1. A process for increasing rejection with a permeable membrane which is a nano filtration membrane or a reverse osmosis membrane and comprising a polyamide based material, said process comprising treating the permeable membrane with an agent for increasing rejection with a permeable membrane, wherein said agent comprises a cationic macromolecule having a heterocyclic ring which is a polyvinylamidine represented by the following formula [1]:

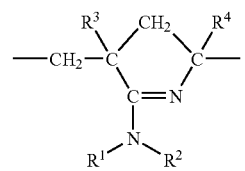

[1]

or a derivative thereof having a weight-average molecular weight of 100,000 or greater, wherein R$^1$ to R$^4$ represent a hydrogen atom or an alkyl group.

2. The process according to claim 1, wherein the polyamide based material is an aromatic polyamide material.

3. The process according to claim 1, wherein the agent comprises a tracer for confirming the rejection, said tracer comprising an inorganic electrolyte or an organic compound soluble in water.

4. A process for increasing rejection with a permeable membrane which is a nano filtration membrane or a reverse osmosis membrane and comprising a polyamide based material, said process comprising treating the permeable membrane a plurality of times with agents for increasing rejection with a permeable membrane, wherein said agents comprise a first agent for increasing rejection with a permeable membrane which comprises an aqueous solution of a cationic macromolecule having a weight average molecular weight of 100,000 or greater and a second agent for increasing rejection with a permeable membrane which comprises an aqueous solution of an anionic macromolecule having a weight average molecular weight of 100,000 or greater, and the permeable membrane is treated alternately with said first agent and then with said second agent or with said second agent and then with said first agent, wherein said treating is conducted by passing the first agent and then the second agent alternately through a module in which the permeable membrane is disposed or by passing the second agent and then the first agent alternately through a module in which the permeable membrane is disposed, or by dipping the permeable membrane into the first agent and then into the second agent alternately or by dipping the permeable membrane into the second agent and then into the first agent alternately, thereby the cationic macromolecule and the anionic macromolecule are adsorbed in the permeable membrane, wherein each of the first and second agents comprises a tracer for confirming the rejection comprising an inorganic electrolyte or an organic compound soluble in water.

5. A process for increasing rejection with a permeable membrane which is a nano filtration membrane or a reverse osmosis membrane and comprising a polyamide based material, said process comprising treating the permeable membrane a plurality of times with agents for increasing rejection with a permeable membrane, wherein said agents comprise a first agent for increasing rejection with a permeable membrane which comprises an aqueous solution of a cationic macromolecule having a weight average molecular weight of 100,000 or greater, wherein said cationic macromolecule is a polyvinylamidine, represented by the following formula [1]

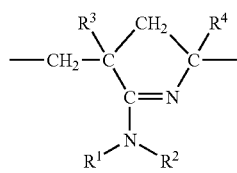

[1]

or a derivative thereof, wherein $R^1$ to $R^4$ represent a hydrogen atom or an alkyl grout, and a second agent for increasing rejection with a permeable membrane which comprises an aqueous solution of an anionic macromolecule having a weight average molecular weight of 100,000 or greater, and the permeable membrane is treated alternately with said first agent and then with said second agent or with said second agent and then with said first agent, wherein said treating is conducted by passing the first agent and then the second agent alternately through a module in which the permeable membrane is disposed or by passing the second agent and then the first agent alternately through a module in which the permeable membrane is disposed, or by dipping the permeable membrane into the first agent and then into the second agent alternately or by dipping the permeable membrane into the second agent and then into the first agent alternately, thereby the cationic macromolecule and the anionic macromolecule are adsorbed in the permeable membrane.

6. The process according to claim 5, wherein the permeable membrane to be treated is an unused permeable membrane or a permeable membrane having the same rejection as a rejection with an unused permeable membrane.

7. The process according to claim 5, wherein the permeable membrane to be treated is a permeable membrane having a rejection decreased from a rejection with an unused permeable membrane.

8. A permeable membrane which is treated in accordance with the process according to claim 5.

9. The process according to claim 5, wherein the anionic macromolecule is polyacrylic acid or a derivative thereof.

10. The process according to claim 5, wherein the anionic macromolecule is polystyrenesulfonic acid or a derivative thereof.

11. The process according to claim 5, wherein each of the first agent and the second agent comprises a tracer for confirming the rejection comprising an inorganic electrolyte or an organic compound soluble in water.

12. The process according to claim 5, wherein said treating is conducted by passing the first agent and then the second agent alternately through a module in which the permeable membrane is disposed or by passing the second agent and then the first agent alternately through a module in which the permeable membrane is disposed.

* * * * *